United States Patent [19]

Wendt

[11] Patent Number: 4,982,493

[45] Date of Patent: Jan. 8, 1991

[54] EXTRACTION DEVICE FOR LOCK CYLINDERS

[76] Inventor: Adalbert Wendt, Sonnenhang 17 D-5010, Bergheim 3, Fed. Rep. of Germany

[21] Appl. No.: 327,985

[22] PCT Filed: Jun. 16, 1988

[86] PCT No.: PCT/EP88/00535

§ 371 Date: Feb. 28, 1989

§ 102(e) Date: Feb. 28, 1989

[87] PCT Pub. No.: WO89/00229

PCT Pub. Date: Jan. 12, 1989

[30] Foreign Application Priority Data

Jun. 29, 1987 [DE] Fed. Rep. of Germany ... 8708961[U]

[51] Int. Cl.5 .......... B23P 19/00

[52] U.S. Cl. .......... 29/804; 29/264

[58] Field of Search .......... 29/264, 426.4, 426.5, 29/804; 70/367, 368, 369, 370, 371, 449; 81/15.9

[56] References Cited

U.S. PATENT DOCUMENTS

| | | | |
|---|---|---|---|
| 3,599,311 | 8/1971 | Ellis | 29/266 X |
| 3,816,988 | 6/1974 | Kitts | 29/263 |
| 4,059,883 | 11/1977 | Osborne | 29/259 |
| 4,261,093 | 4/1981 | Steffer et al. | 29/426.4 |
| 4,307,983 | 12/1981 | Blough et al. | 29/426.4 X |
| 4,338,806 | 7/1982 | Cox | 70/417 |
| 4,586,233 | 5/1986 | Markisello | 29/426.4 |
| 4,707,903 | 11/1987 | McCartney | 29/426.5 |

FOREIGN PATENT DOCUMENTS

| | | |
|---|---|---|
| 8602608 | 12/1985 | Fed. Rep. of Germany . |
| 2068051 | 8/1981 | United Kingdom . |

*Primary Examiner*—Joseph M. Gorski
*Attorney, Agent, or Firm*—Spencer & Frank

[57] ABSTRACT

Loss of the key to a lock equipped with a lock cylinder has the result that the respective lock can be opened only with a considerable loss of time and expenditure of funds. This problem is solved in that an extraction device is provided for lock cylinders in door locks or the like. This device is characterized by a supporting bridge (1) equipped with a passage bore (4) for a self-tapping screw (5) to be inserted into the lock cylinder to be extracted so as to act as tension rod and with two lifting screws (2) arranged in the end region of the supporting bridge (1) and oriented parallel to the passage bore (4). With this device it is possible, in particular, to prevent the door from being damaged when the lock cylinder is extracted.

4 Claims, 1 Drawing Sheet

EXTRACTION DEVICE FOR LOCK CYLINDERS

BACKGROUND OF THE INVENTION

The invention relates to an extraction device for lock cylinders in door locks or the like.

Loss of the key for a lock equipped with a lock cylinder has the result that the lock in question can be opened only with a considerable loss of time and expenditure of funds. In connection with doors there additionally exists the danger that the door itself will be damaged, particularly if the free end of the lock cylinder projecting from the door is additionally protected by a safety fitting which makes the attachment of a tool impossible.

SUMMARY OF THE INVENTION

It is an object of the invention to provide a device which permits access to the locking bolt of the lock by extracting the lock cylinder.

This is accomplished according to the invention by a supporting bridge including a passage bore for a self-tapping screw to be screwed into the lock cylinder to be extracted and serving as the tension rod and two through-going lifting screws disposed in the end region of the supporting bridge and oriented in parallel with the passage bore. In the case of use, the supporting bridge with the self-tapping screw inserted is placed in front of the lock cylinder to be extracted and initially the self-tapping screw is screwed into the keyway. The free ends of the lifting screws held by the supporting bridge are advanced toward the door by screwing until they come to lie against the door. Then, they are further screwed in alternatingly turning each one only a slight partial turn so that the stress on the self-tapping screw serving as the tension rod will increase progressively in the axial direction until finally the locking means in the lock cylinder are sheared off and the lock cylinder can be extracted toward the outside. Although two lifting screws are provided which are turned independently of one another, it is possible to exert the necessary axial force on the self-tapping screw without generating bending stresses. The arrangement of two lifting screws here has the advantage that the alignment of the supporting bridge with respect to the axis of the self-tapping screw can be effected while adapting it to the conditions of the respective lock and the respective safety fitting since the two lifting screws can be advanced independently of one another. With unfavorable fitting situations there even exists the possibility of placing corresponding adapters underneath.

An additional feature of the invention further provided is further provided that the self-tapping screw is configured as a flat-head screw and the passage bore is provided with a countersink to receive the screw head. This has the advantage of the best possible introduction of force between the supporting bridge and the self-tapping screw so that it is ensured, in this way, that the self-tapping screw will not tear off.

As a further feature of the invention, the supporting bridge, on its side facing the lock cylinder, is provided with two recesses each accommodating a supporting foot on which one of the lifting screws is rotatably supported. The arrangement of such a supporting foot has the advantage that pressure acting on the door fitting or the door panel is reduced to such an extent that the surface can no longer be damaged there. Additionally, it is also possible to provide the standing surface for the supporting foot with a coating of an elastically deformable material. In this way it is ensured that, if the supporting bridge is pulled slightly "askew" relative to the lock fitting or the door panel, there will not be generated any edge pressures which would lead to damage of the surface. Due to the fact that the supporting feet are each guided in a recess in the supporting bridge, it is ensured during operation that "skewed pulling" due to non-uniform turning of the lifting screws is limited to a minimum and no undue bending stresses are able to affect the self-tapping screw.

BRIEF DESCRIPTION OF THE DRAWINGS

The invention will now be described in greater detail with reference to the schematic drawings of an embodiment thereof. It is shown in.

DETAILED DESCRIPTION OF INVENTION

Figure 1:
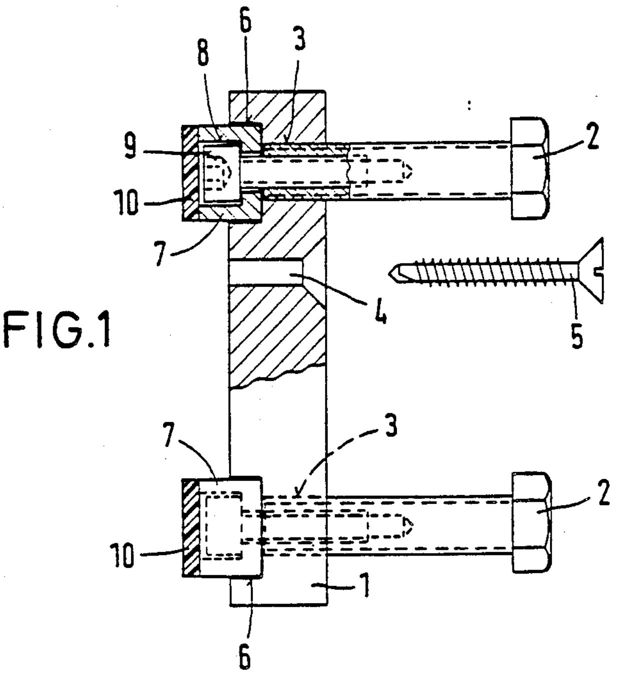
FIG. 1, a side view, partially in section.
Figure 2:
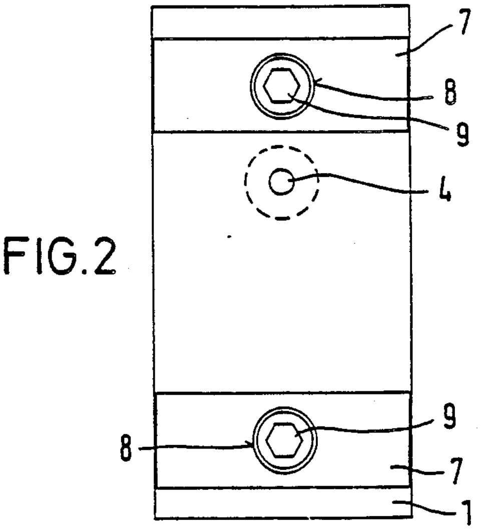
FIG. 2, a bottom view of FIG. 1.

The extraction device shown in FIG. 1 includes a supporting bridge 1 which is provided with two lifting screws 2 held in threaded bores 3 in the end region of supporting bridge 1. Supporting bridge 1 is also provided with a passage bore 4 which is provided with a countersink and serves to accommodate a self-tapping screw 5 in the form of a flat-head screw. In the case of use, the flat head screw 5 is brought through passage bore 4 and is screwed by means of a screwdriver into the keyway of the lock cylinder to be extracted. Lifting screws 2 are here initially screwed back into their starting positions.

On its side facing the lock cylinder to be extracted, supporting bridge 1 is provided with groove-shaped recesses 6 each accommodating a strip-shaped supporting foot 7. Supporting feet 7 are here each provided with a stepped bore 8 which serves to accommodate a hex socket screw 9 by means of which supporting foot is rotatably connected with lifting screw 2. The faces of supporting feet 7 facing the lock cylinder to be extracted are provided with a covering 10 of an elastically deformable material, for example rubber of a sufficient Shore hardness.

In the case of use, after the self-tapping screw 5 serving as the tension rod has been screwed into the keyway of the lock cylinder to be extracted, each supporting foot 7 is initially screwed manually by way of its associated lifting screw 2 until it comes to rest against the door panel or the lock fitting, respectively. The alignment of the supporting bridge with respect to the axis of self-tapping screw 5 is here effected automatically by the guiding of the screw shank in passage bore 4. Thereafter, the two lifting screws 2 are alternatingly advanced further with the aid of a screwdriver by only small angles of rotation so that the orientation of the supporting bridge relative to the self-tapping screw serving as the tension rod remains in effect. This causes supporting bridge 1 to be lifted axially away from the surface of the door until finally the axial force acting on the lock cylinder by way of self-tapping screw 5 is so great that the holding means are sheared off and the lock cylinder can be extracted completely enabling the locking bolt of the lock to be moved from the outside. With some practice, lifting screws 2 can also be advanced simultaneously with the aid of two screwdrivers so that "skewed pulling", which would result in breakage of self-tapping screw 5, is reliably prevented.

I claim:

1. Extraction device for lock cylinders in door locks comprising a supporting bridge including a passage bore and a self-tapping screw in said passage bore, said self-tapping screw being adapted to be screwed into a lock cylinder to be extracted, the self-tapping screw serving as a tension rod; two through-going lift screws each arranged in an end region of the supporting bridge and parallel to the passage bore; and two supporting feet, wherein on its side to be facing the lock cylinder, the supporting bridge further includes two recesses within which are arranged said two supporting feet, respectively, said supporting feet rotatably supporting said lifting screws.

2. Extraction device according to claim 1, wherein each supporting foot has a standing surface facing the lock cylinder to be extracted, the standing surface being provided with a covering of an elastically deformable material.

3. Extraction device for lock cylinders in door locks comprising a supporting bridge including a passage bore and a self-tapping screw disposed in said passage bore, said self-tapping screw adapted to be screwed into a lock cylinder to be extracted, the self-tapping screw having a flat-head and serving as a tension rod, the passage bore being provided with a countersink to accommodate the screw head; two through-going lifting screws each arranged in an end region of the supporting bridge and parallel to the passage bore; and two supporting feet, wherein on its side to be facing the lock cylinder, the supporting bridge further includes two recesses within which are arranged said two supporting feet, respectively, each of said supporting feet rotatably supporting a respective one of said lifting screws.

4. Extraction device according to claim 3, wherein each supporting foot has a standing surface facing the lock cylinder to be extracted, the standing surface being provided with a covering of an elastically deformable material.

* * * * *